July 21, 1959

E. C. MYERS 2,895,282

MECHANISM FOR DYNAMICALLY BALANCING
THE WORK FORCE OF A WORK LOAD

Filed May 22, 1956

INVENTOR.
EDWARD C. MYERS
BY
*[signature]*
ATTORNEY

July 21, 1959
E. C. MYERS
2,895,282
MECHANISM FOR DYNAMICALLY BALANCING
THE WORK FORCE OF A WORK LOAD
Filed May 22, 1956
2 Sheets-Sheet 2
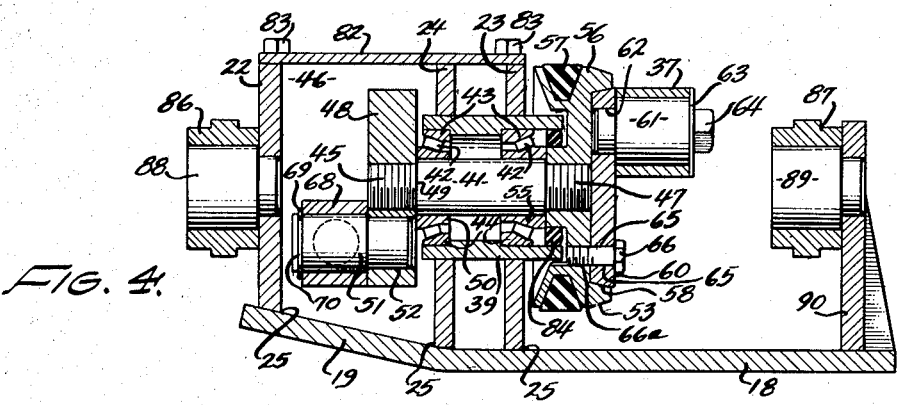
FIG. 4.
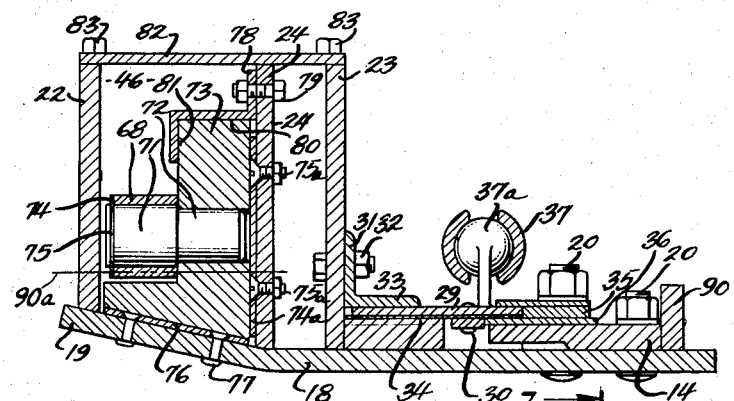
FIG. 5.
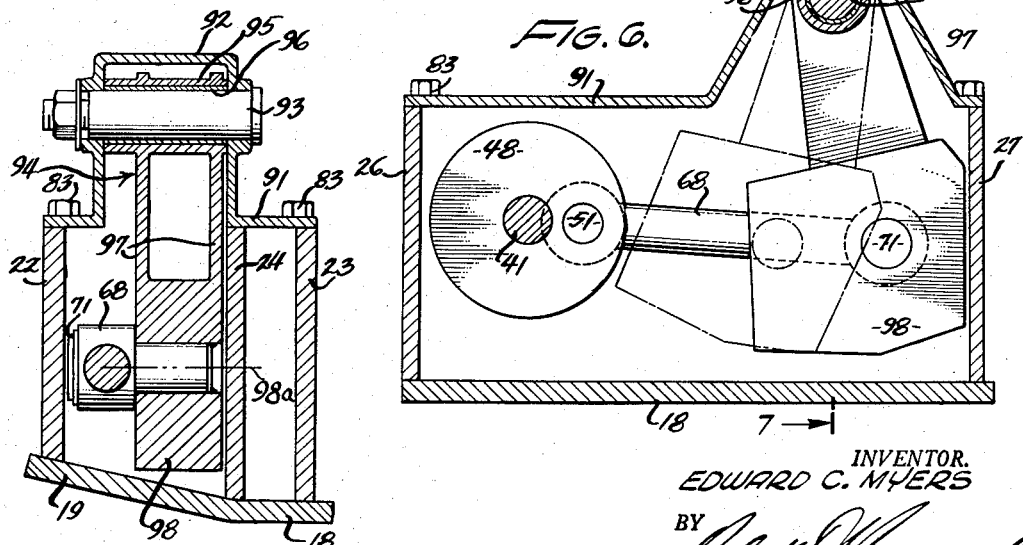
FIG. 6.
FIG. 7.
INVENTOR.
EDWARD C. MYERS
BY
ATTORNEY United States Patent Office 2,895,282
Patented July 21, 1959

2,895,282

MECHANISM FOR DYNAMICALLY BALANCING THE WORK FORCE OF A WORK LOAD

Edward Charles Myers, Santa Barbara, Calif.

Application May 22, 1956, Serial No. 586,492

5 Claims. (Cl. 56—306)

The present invention relates to agricultural machines and more particularly to a mower embodying a drive means wherein the parts are so arranged as to effect a dynamically balanced action upon reciprocation of the mower sickle.

While many improvements have been made in mower construction of the generally accepted design, the speed or reciprocation of the sickle and the high stress vibrations and forces imparted to the carrying machine have to a great extent limited the speed of travel at which machines of this type can be operated. It will be appreciated that the slower the speed at which the sickle is operated, the slower the speed at which the mower can be moved through a field and the less acreage that can be cut in any given period of time. The horse-drawn mower was operated usually at a speed of 1½ to 2½ miles per hour and while these mowers still had the problem of stress vibrations from reciprocation of the sickle, the machines could be built sturdily enough to withstand these vibrations at these low speeds. A tractor operated mower, however, is operated at considerably higher speeds than the old horse drawn mower and at these excessive speeds, say for instance, 5 to 6½ miles per hour, the stresses and attendant vibrations resulting from reciprocation of the sickle, from 1300 to 1500 reciprocations per minute at these high speeds, are sufficient in a comparatively short period of time to result in an unsatisfactorily short life. This is more clearly appreciated when it is realized that the present tractor-operated mowers employ the same basic principles of operation developed approximately 85 years ago and that the forces which produce vibration on any reciprocating mass increase with the square of the speed. Therefore, while mowers have been known to give service behind horses at speeds from 1½ to 2½ miles per hour for from 1500 to 2000 hours, tractor operated mowers operated at speeds from 5 to 6½ miles per hour have to be completely rebuilt after 160 to 200 hours service. While many attempts have ben made to develop a drive means which incorporates parts for dynamically balancing the work force of the sickle, none of these developments have been entirely successful on a commercial basis. The present invention contemplates means for dynamically balancing the reciprocating movement of the sickle at all practical mowing speeds, so that a mower can be operated at high speeds without wearing out or requiring extensive repair and adjustment after a comparatively short period of operation.

It is, therefore, a primary object of the present invention to generally improve the operation and construction of machines of this type.

A further object of the present invention is to provide a driving means for the sickle of a mower which includes elements for dynamically balancing the action of the sickle whereby the speed of operation of the mower may be materially increased without the heretofore attendant destructive vibrations.

A still further object of the present invention contemplates means whereby a force substantially equal to the weight of the sickle is moved in unison with the sickle but in an opposite direction whereby the work force of the sickle is dynamically balanced and whereby destructive vibrations are not developed upon operation of the mower at high speeds.

A still further object of the present invention is to provide a drive mechanism for a sickle which effectively balances the work force of the sickle and which is so designed as to fit within the practical limits of the inner shoe of mower.

Another object of the present invention is to provide mechanism for translating rotary motion into reciprocatory motion and for dynamically balancing the work force of the work load being moved in a reciprocatory path.

Yet another object of the present invention is to provide a mechanism of this type whereby the work force and the counter work force are caused to move in substantially co-planar paths.

It is also an object of the present invention to provide mechanism which is comparatively simple in design and operation and which can be easily and reasonably manufactured.

Other objects and advantages will become apparent to those skilled in the art upon perusal of the following description and drawings, in which:

Fig. 4 is a cross-sectional view taken on the line 4—4 of Fig. 2, with parts removed.

Fig. 5 is a cross-sectional view taken on the line 5—5 of Fig. 3.

Fig. 6 is a view similar to Fig. 3, slighty enlarged, showing a modification of the present invention.

Fig. 7 is a cross sectional view taken on the line 7—7 of Fig. 6.

The principles of the present invention are illustrated as applied to a power-operated mower which can be either of the tractor mounted type or of the type which is carried by its own wheel supported implement carriage and propelled and powered by a suitable prime mover. The invention is concerned primarily with means located, in the present instance, within a combined drive support and shoe of the mower for dynamically balancing the reciprocating movement or load force of the sickle, the details of the mechanism for mounting the mower on a tractor or on a wheel supported implement carriage forming no part of the present invention and not being shown. It will be appreciated, however, that while the present invention is peculiarly applicable to power-operated mowers, that its application is not so limited and it can be used wherever mechanism is employed for translating rotary motion into reciprocatory motion.

Figure 1:
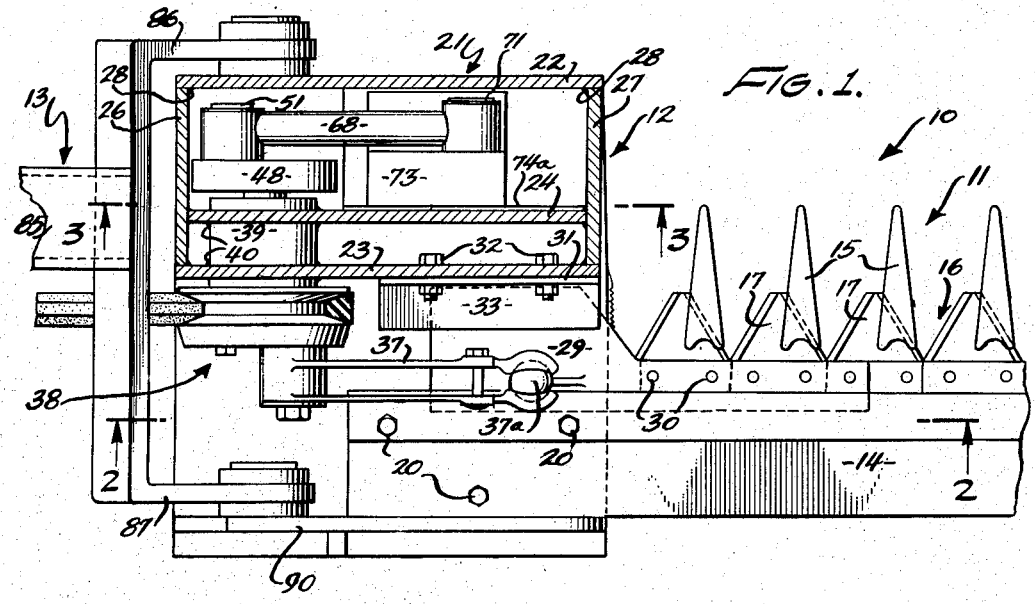
Fig. 1 is a plan view of a power operated mower embodying the principles of the present invention, with parts removed and with parts broken away to show details of construction.
Figure 2:
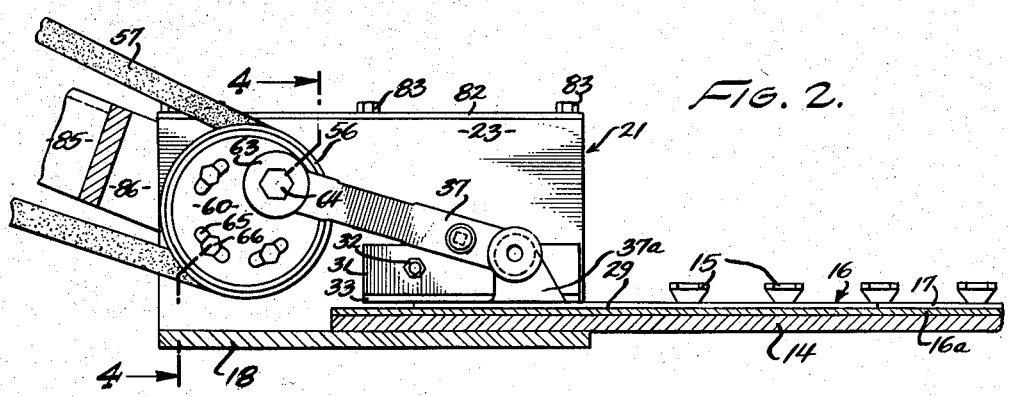
Fig. 2 is a vertical sectional view taken on the line 2—2 of Fig. 1.
Figure 3:
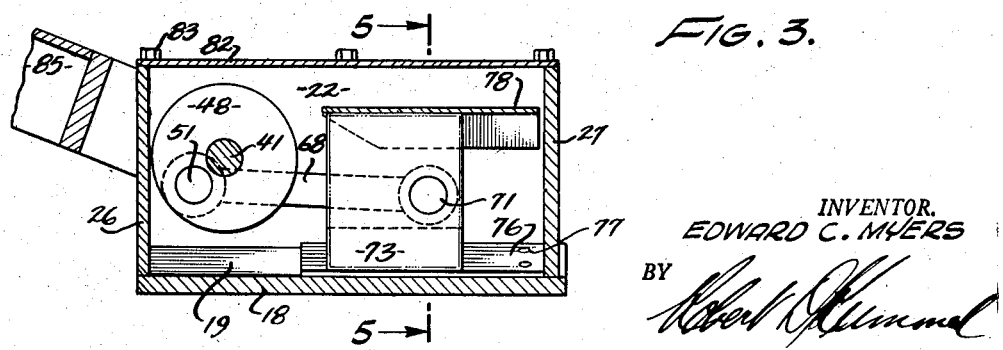
Fig. 3 is a vertical sectional view taken on the line 3—3 of Fig. 1.

Referring now particularly to Figs. 1 through 5 of the drawings, a mower, generally designated by the number 10, comprises a cutter bar assembly 11, an inner shoe assembly 12 and a push bar or frame 13 which supports the cutter bar assembly and inner shoe assembly.

The cutter bar assembly, only a portion of which is shown, can be of any suitable or conventional construction and comprises in the present instance a cutter bar 14 to which is secured a plurality of sickle guards 15 in equally spaced forwardly extending relationship. A sickle or work force 16 which comprises a knife back 16a to which is secured a plurality of sickle sections 17 is reciprocatable relative to the guards 15 so as to move the sections in cutting relationship with respect to the guards in a manner well known in the art.

The inner shoe assembly comprises a combined drive support and shoe 18 which is formed of heavy gauge sheet metal and which has an upturned front end portion 19 for well known purposes. The cutter bar 14 is securely bolted to the shoe 18 adjacent its rearward end by suitable bolts 20 so that the inner shoe assembly and the cutter bar assembly constitute a rigid integral structure. A suitable housing 21 is formed adjacent the forward end of the shoe 18 and can be of fabricated construction. The housing 21 in the present instance consists of a front wall 22, a rear wall 23 and a middle wall 24, each of these walls being formed of rigid sheet metal and each being fixed to shoe 18 in an upstanding position as by welding indicated at 25. Suitable side walls 26 and 27 are fixed to each of the front, middle and rear walls and to shoe 18 as by welding as indicated at 28. A knife head 29 of any suitable or well known construction is secured to the inner end of the knife back 16a by suitable rivets 30 and a knife cap 31 angular-shaped in cross section is secured to rear wall 23 by bolts 32. The knife cap plate has a leg 33 which is positioned for guiding the knife head 29 in a predetermined path of movement on an inner-shoe ledger plate 34. A knife cap 35 is also provided for guiding the knife head to move on a wear plate 36 in a predetermined path when in operation and is secured to cutter bar 14 by bolts 20.

A short pitman 37 of any suitable or well known construction is suitably connected with a knife head ball 37a and a drive mechanism 38 is interconnected between pitman 37 and a source of rotary power.

As previously suggested the drive mechanism 38 is so constructed as to translate the rotary motion from a power source into a force which will drive the sickle in a reciprocatory path of movement while at the same time dynamically balance the work force of the reciprocatory sickle so as to effectively and completely eliminate all resultant stress and vibrations attendant upon operation of the sickle.

This is effected by mechanism including a tubular housing 39 carried by the combined drive support and shoe 18 and rigidly fixed in the middle and rear walls 23 and 24 as by welding indicated at 40 so that the axis of the housing is substantially normal to the path of travel of sickle 16. A crank shaft 41 is rotatably carried in housing 39 so as to be mounted in the combined drive support and shoe by suitable anti-friction bearings 42, the outer race 43 of each of these bearings being located against a shoulder 44 formed on the inner circumference of housing 39. The shaft is formed of such a length that a threaded portion 45 of less diameter extends beyond one end of housing 39 into a lubricant containing chamber or housing 46 defined by front and middle walls 22 and 24 and side walls 26 and 27 at one end and a threaded portion 47 at the other end also of less diameter extends beyond the other end of housing 39.

A crank wheel 48 is received by threaded portion 45 and located against a shoulder 49 so as to act as a stop for the inner race 50 of its adjacent bearing 42. An eccentric pin or crank engaging portion 51 is pressed and welded in an opening 52 formed in wheel 48.

A crank wheel 53 is likewise threadedly received by portion 47 and acts as a stop for the inner race 55 of its adjacent bearing 42. This crank wheel 53 is in the form of a sheave 56 around which is trained a V-belt 57. The belt is drivingly connected with a suitable power source for transmitting to the sheave 56 the necessary rotative power for transmission to the sickle for operating the same.

The crank wheel 53 has a recessed face 58 which snugly receives a crank pin plate 60. The plate 60 receives an eccentric pin or crank engaging portion 61 pressed and welded in place in an opening 62 and the other end of pitman 37 is rotatably received by pin 61, a washer 63 and a hold down bolt 64 being provided for retaining the pitman on this pin. Inasmuch as the operation of the present mechanism is dependent upon pin 51 being oppositely disposed or substantially 180° out of phase with respect to pin 61 as will be more fully appreciated hereinafter and inasmuch as crank wheels 48 and 53 are held to shaft 41 solely by means of their threaded connection with portions 45 and 47 in order that the drive mechanism can be designed to fit within the practical size limits of an inner shoe assembly, the plate 60 is so secured to wheel 53 as to be capable of easy and ready adjustment.

More specifically the plate 60 has formed therein a plurality of arcuate slots 65 located around the axis thereof and a hold down screw 66 is received by each of these slots and received by an associated opening 66a formed in wheel 53. It will be appreciated, therefore, that plate 60 can be easily so located in recess 58 as to position pin 61 substantially 180° out of phase with respect to pin 51. When the plate is so located screws 66 can be tightened sufficiently to lock plate 60 in recess 58 against relative movement with respect thereto.

The pin 51 rotatably receives one end of a crank arm or pitman 68 and a snap ring 69 is received in an annular groove 70 for retaining the arm on this pin. The other end of arm 68 is rotatably received by a pin 71 which is pressed and welded in an opening 72 formed in a counterweight or counter work force or piston 73, a snap ring 74 being received in an annular groove 75 for retaining this end of the arm 68 on pin 71.

The counterweight 73 is substantially L-shaped in the present instance and is in sliding relationship in piston chamber 46 and with respect to a bearing plate 74a secured by suitable screws 75a to the middle wall 24 and a bearing plate 76 secured by suitable rivet 77 to the upturned portion 19 of the shoe 18. A Z-shaped guide member 78 is also secured by bolts 79 to the middle wall 24 so that a horizontal surface 80 and a vertical surface 81 are positioned in inimate and guiding relationship with respect to the counterweight. The counterweight is substantially equivalent to the weight of the sickle so that the work force of the counterweight upon reciprocation is substantially equal to the work force of the sickle upon reciprocation, and as previously suggested the pin 51 is substantially 180° out of phase with respect to the pin 61.

The housing 21 is provided with a top lid 82 which is held in position by suitable screws 83. It will be appreciated that in operation a sufficient quantity of oil is placed in piston chamber 46 to insure adequate lubrication of the counterweight. It will also be appreciated that this lubricant will be splashed by the movement of the counterweight into housing 39 so as to properly lubricate the antifriction bearings 42. The opposite end of the housing 39 receives a suitable seal 84 for well known purposes.

The frame 13, only a portion of which is shown, consists of a fork shaped member 85 which has arms 86 and 87. A suitable trunnion 88 extends from the front wall 22 and a trunnion 89 extends from a standard 90 which is welded to the shoe 18 adjacent the rearward edge thereof, the arms 86 and 87 being suitably secured to their respective trunnions for supporting the sickle mechanism and the inner shoe mechanism with respect thereto.

The pin 71 is so located in counterweight 73 that the counterweight will not be caused to rock, bind or tip in piston chamber 46 upon movement of the counterweight, and it will be noted that the horizontal plane of the axis of pin 71 is substantially co-planar with the horizontal plane of the axis of the interconnection of pitman 37 with knife head ball 37a so that the center line 90a of the counterweight is substantially co-planar with the plane of movement of the sickle or work force. It will also be appreciated that the counterweight is located immediately adjacent the knife head so that the attendant vibrations upon reciprocation of the sickle cannot set up a torsional reaction. In operation, therefore, rotation of the driving sheave 56 will impart a reciprocatory motion to pitman 37 by reason of its connection with eccentric pin 61. Since the wheel 48 is rotated in unison with sheave 56 and since the eccentric pin 51 is located substantially 180° out of phase with respect to pin 61 the counterweight will be caused to move in unison with and in a direction opposite to the direction of the movement of the sickle, and since the weight of the counterweight is substantially equal to the weight of the sickle the two work forces will cancel each other. It will be appreciated that if the center line of the counterweight were not located in substantially the plane of movement of the work force or sickle that a torque reaction would develop to the extent that the movement of the work force or sickle would not be dynamically balanced by the corresponding movement of the counterweight. Actual tests have proven that having the driven points of the work mass and counter work mass within one and one-half inches of parallel produces a negligible amount of torsional force. Above this relationship, however, the torsional reaction becomes noticeable and at three inches starts to seriously counteract the effort of the opposed work forces to cancel out the vibrations. While at this relationship the attendant vibrations could be contained or controlled through the use of a very heavy housing and oversized bearings throughout, the relationship wherein the opposing work forces are trained to move in substantially co-planar paths does not just contain or isolate the attendant vibrations but completely cancels them out. A mower utilizing the described drive mechanism can be operated at substantially higher speeds than present mowers are capable of withstanding without attendant vibrations being transmitted to the frame 13. For instance, a mower incorporating this drive mechanism either mounted directly to the tractor or on a wheel supported implement carriage can be operated at speeds of 5 to 6½ miles per hour without damage to the mower and with greatly reduced noise.

Figs. 6 and 7 illustrate a different embodiment for effecting the principles of the present invention. In this particular instance a top lid 91 is provided which has a raised supporting portion 92. A supporting pin 93 is carried by the portion 92 for swingably supporting a pendulum or counter work force broadly indicated as 94. The pendulum 94 is preferably in the form of a casting or forging and includes a tubular hub 95 which receives a suitable bearing 96, the hub 95 and bearing 96 being received by supporting pin 93 so as to turn thereon while being confined with respect to axial movement thereon by the sides of the raised portion 92. A pair of arms 97 depend from the hub 95, and a counterweight 98 is located between the arms 97 adjacent the lower ends thereof.

The pin 71 in this instance is pressed and welded in an opening formed in the counterweight 98 so that the crank arm 68 upon rotation of the crank wheel 48 will rock the pendulum back and forth in the direction of travel of the sickle upon rotation of drive shaft 41.

The axis of pin 71, as likewise described with reference to the mechanism disclosed in Figs. 1 through 5, is substantially co-axial when the pendulum is in its downwardly depending position with the axis of interconnection of pitman 37 with drive head ball 37a. The axis of pin 71 is also located at the center of gravity of the pendulum 94 so that the counterweight 98 is driven from its neutral axis 98a, and the counterweight is trained to move in a path substantially co-planar with the plane of movement of the sickle bar. It will be appreciated that if the pendulum were not driven from its neutral axis that the load force of the counterweight in operation would react through the arms 97 with great force on support pin 93 so that the entire drive mechanism would have to withstand substantial torsional shock loads and vibrations. It will also be appreciated that the radius of the path of movement of the counterweight is sufficiently large so that the counterweight for practical purposes moves in a plane substantially co-planar with the path of movement of the sickle.

It will be appreciated that in operation the pendulum is so phased with respect to movement of the sickle as to substantially eliminate all vibrations attendant upon reciprocation of the sickle. Also as previously pointed out the plate 60 can be set in relation to the axis of shaft 41 at the position wherein the smoothest operation is effected. While under ideal conditions the counterweight and the sickle would be phased substantially 180° apart, assuming that the counterweight was exactly equal to the weight of the sickle and assuming further that the sickle was subject to no further frictional drag than the counterweight, it will be appreciated that in actual operation the frictional resistance or drag of the sickle and any slight differences in weight between the sickle and the counterweight, which in turn will be variable due to wear of the sickle, the counterweight and the sickle bar may not be phased exactly 180° apart. It will be appreciated, therefore, that the adjustable plate 60, which permits a variation of from 0 to approximately 11 degrees from a theoretically correct setting for the eccentric pins of 180° apart, is extremely important for perfect operation, inasmuch as the counterweight load is constant while the sickle load is variable.

What is claimed is:

1. A drive mechanism for a reciprocating type mower comprising a cutter bar, a sickle mounted for reciprocation on said cutter bar, a combined drive support and shoe on the inner end of said cutter bar, a power-driven crank shaft mounted in said support normal to the longitudinal axis of said cutter bar, said crank shaft having oppositely disposed crank engaging portions, a pitman interconnecting a first of said portions and said sickle, a counterweight slideably mounted on said support in substantially the same plane as that of said sickle, a pitman interconnecting a second of said portions and said counterweight, and a lubricant containing housing enclosing said counterweight and said second crank engaging portion of said crank shaft.

2. The mechanism defined in claim 1 further characterized by a power-driven sheave fixed on said crank shaft adjacent said first portion.

3. The mechanism defined in claim 1 further characterized by said housing enclosing said crank shaft to a point adjacent said first crank engaging portion.

4. The mechanism defined in claim 1 further characterized by a mower supporting frame, and means for swingably mounting said combined drive support and shoe to said supporting frame for up-and-down swinging movement of said cutter bar and sickle.

5. The mechanism defined in claim 4 further characterized by said crank shaft being co-axial with the swingable mounting of said combined drive support and shoe to said supporting frame.

References Cited in the file of this patent

UNITED STATES PATENTS

| | | |
|---|---|---|
| 2,345,383 | Curtis | Mar. 28, 1944 |
| 2,428,924 | Albertson | Oct. 14, 1947 |
| 2,699,745 | Ayres | Jan. 18, 1955 |
| 2,736,156 | Hardman | Feb. 28, 1956 |
| 2,769,297 | Orelind et al. | Nov. 6, 1956 |
| 2,796,720 | Carlson | June 25, 1957 |